June 20, 1939.  R. C. MASON  2,163,402
MEASURING APPARATUS
Filed July 26, 1937  2 Sheets-Sheet 1
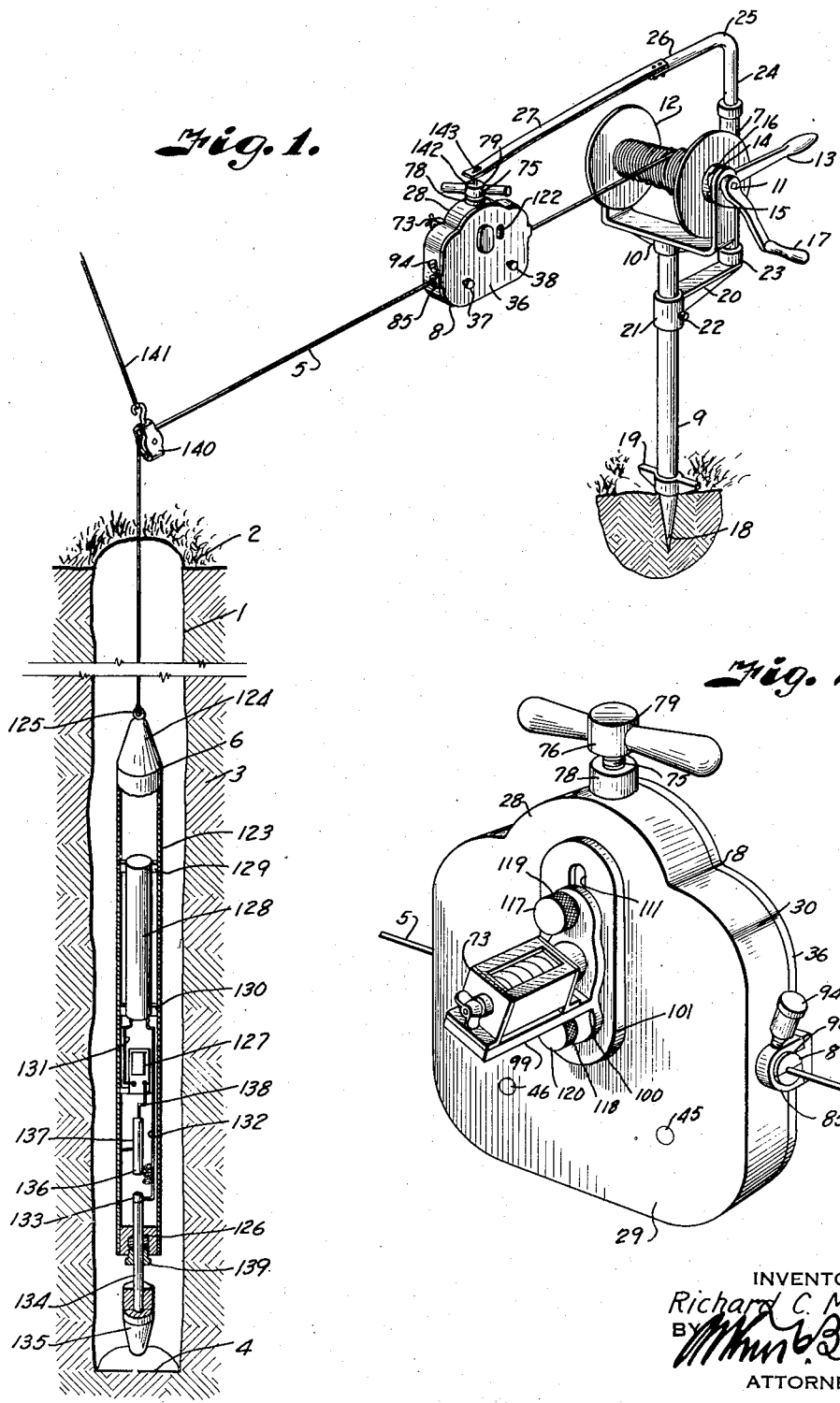
INVENTOR
Richard C. Mason.
BY 
ATTORNEY June 20, 1939.   R. C. MASON   2,163,402
MEASURING APPARATUS
Filed July 26, 1937   2 Sheets-Sheet 2
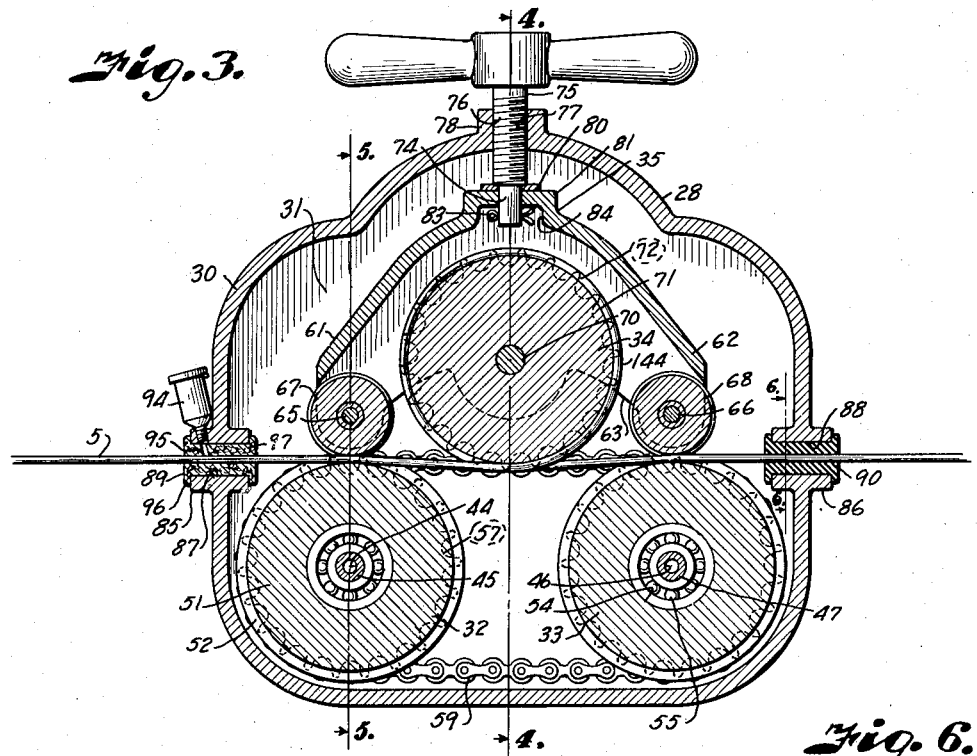
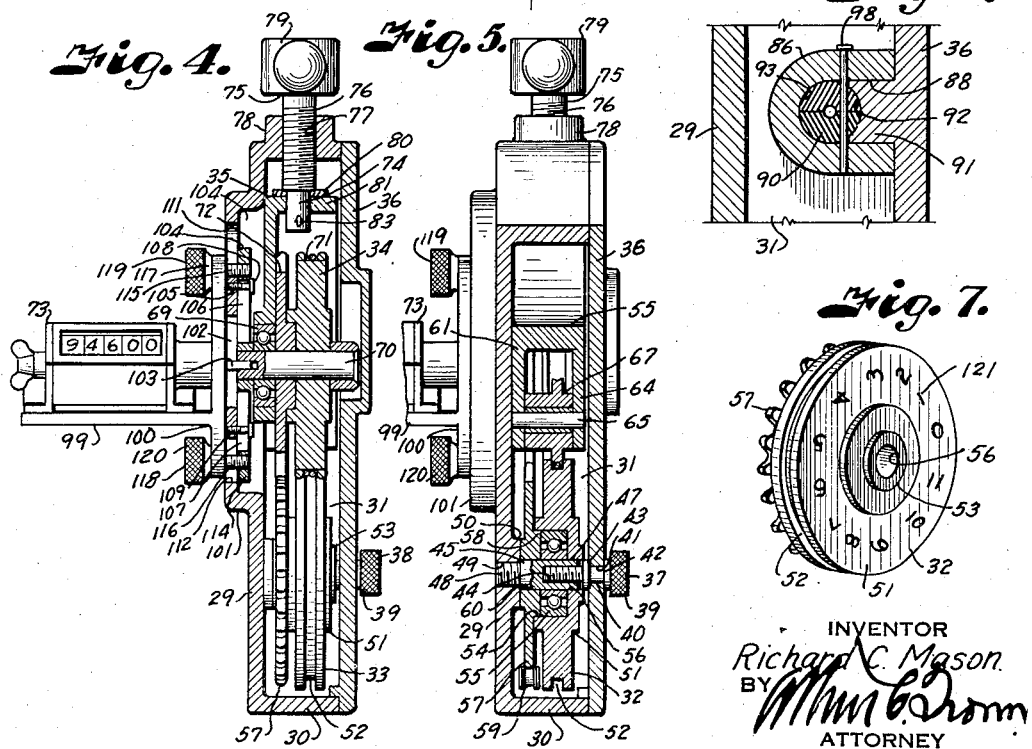
INVENTOR
Richard C. Mason
BY
ATTORNEY Patented June 20, 1939

2,163,402

UNITED STATES PATENT OFFICE 2,163,402

MEASURING APPARATUS

Richard C. Mason, Tulsa, Okla.

Application July 26, 1937, Serial No. 155,646

3 Claims. (Cl. 33—134)

This invention relates to a measuring apparatus, particularly for ascertaining the depth of wells and the like, and has for its principal object to provide an apparatus of this character which is accurate in operation.

Other important objects of the invention are to provide a measuring device with a resilient mounting to relieve strain upon the measuring line; to provide a measuring device with a sounding mechanism to indicate the exact instant the well bottom is reached; to provide a measuring device constructed to compensate for stretch in the measuring line; to prevent slippage of the measuring line relative to the registering mechanism; to provide a measuring device with means for automatically lubricating the measuring line; and to provide the device with means for removing excess lubricant and for wiping the line when it is withdrawn from a well.

In accomplishing these and other objects of the invention, as hereinafter pointed out, I have provided improved details of structure, the preferred form of which is illustrated in the accompanying drawings, wherein;

Fig. 1 is a perspective view of a well measuring apparatus constructed in accordance with the present invention and showing the setup thereof for measuring the depth of a well, parts of the sounding device being in section to better illustrate the inner construction.

Fig. 2 is an enlarged perspective view of the measuring device which is employed in the apparatus and viewed from the register side.

Fig. 3 is a central longitudinal section through the measuring device.

Fig. 4 is a cross-section on the line 4—4 of Fig. 3 showing the register in elevation.

Fig. 5 is a similar section on the line 5—5 of Fig. 3, a part of the register being broken away.

Fig. 6 is an enlarged detail section on the line 6—6 of Fig. 3.

Fig. 7 is a detail perspective view of one of the line measuring wheels.

Referring more in detail to the drawings:

I designates a well or similar bore hole extending from the surface of the ground 2 through earth formations 3 and terminating in a bottom 4.

In well drilling practices, for example, in setting casing, packers, plugs, and bridges, or in setting explosive charges and the like, it is necessary to accurately determine the depth of the well to facilitate these operations. Any errors occurring in the measurement of a well result in mislocation of the various fittings, which not only involves a considerable expense, but often results in serious damage to or loss of the well. I have, therefore, provided an apparatus wherein the depth of the well may be accurately measured so that the setting of well equipment or other well operations may be carried on at the desired levels.

In carrying out the invention, I provide a measuring line 5, a sounding device 6, a reeling mechanism 7 for running in and withdrawing the line, and a measuring device 8 for registering the amount of line run into and withdrawn from the well in standard units of measure, such as the foot measure.

The reeling mechanism preferably includes a post 9 having a yoke-shaped head 10 supporting a reel shaft 11. Fixed on the shaft 11 is a spool type reel 12 on which the measuring line 5 is stored, and adapted to be withdrawn therefrom under control of a suitable brake mechanism. The brake mechanism includes a lever 13 having a hub 14 that is loosely mounted on the shaft 10 and has a braking face engaging against the end of the spool when the lever 13 is depressed to effect engaging movement of the braking surface against the reel. In the illustrated instance, the engaging effect is produced by providing the hub of the lever with cam portions 15 which cooperate with fixed cam portions 16 on the yoke-shaped head 10. In the illustrated instance, the reel shaft is rotated to effect winding of the measuring line on the spool by means of a suitable reeling mechanism such as a power pulley or a crank 17 that is fixed to a projecting end of the shaft, as clearly shown in the drawings. The lower end of the post 9 is provided with a point 18, so that it may be readily pressed into the ground under pressure applied to a foot bar 19 fixed to the post. It may, however, be desirable to mount the reel on an automobile or truck take-off in a fixed position.

Vertically adjustable on the post 9 is an arm 20, including a sleeve 21, which is adapted to be secured in adjusted position by a set screw 22 carried by the sleeve and engaging the side of the post. The outer end of the arm 20 carries a tubular socket 23 to loosely mount the shank 24 of an elbow shaped bracket 25, the shank 24 being preferably mounted in antifriction bearings carried within the socket 23 to provide free swinging movement of the lateral arm 26 of the bracket. Fixed to the outer end of the arm 26 is a leaf spring 27 for flexibly suspending the measuring device 8, now to be described.

The measuring device 8 is best illustrated in

Figs. 2 to 5, inclusive, and is shown as including a casing 28, having a rear wall 29 provided with a laterally extending peripheral flange 30 to provide a measuring wheel compartment 31 of suitable dimensions for enclosing a plurality of measuring wheels 32, 33 and 34, and a line tensioning device 35, as later described. The casing further includes a removable cover plate 36 that is supported in lapping relation with the flange 30, and secured by fastening devices 37 and 38. The fastening devices 37 and 38 include knurled heads 39, having shanks 40 rotatable in openings 41 in the cover plate, and having spaced collars 42 and 43 engaging the respective sides of the plate to anchor the attaching devices from displacement. The terminal ends of the shanks are provided with threads for engaging in threaded sockets 44 in spindles 45 and 46.

The spindles each have bearing portions 47 extending substantially across the depth of the casing to mount the measuring wheels 32 and 33, previously mentioned. The spindles are provided with reduced threaded shanks 48 that are engaged in threaded openings 49 provided in bosses 50, formed integrally with the wall 29 of the casing as best shown in Fig. 5. The measuring wheels 32 and 33 are of identically the same construction, and each includes a disk-like body 51 having a peripheral groove 52 for guidingly supporting the measuring line, as best shown in Fig. 3.

The body of the wheels have concentric hub portions 53 provided with concentric recesses 54 for mounting antifriction bearings 55, the closed side of the hubs being provided with bores 56 for loosely passing the terminal ends of the spindles 46.

Cooperating with the measuring wheels are sprockets 57, having concentric hubs 58 wedgingly engaged in the bearing recesses 54 to drivingly connect the measuring wheels therewith, in such a manner that when the wheels are rotated the sprockets move therewith to actuate an endless chain belt 59 extending over the sprockets of the respective measuring wheels 32 and 33. The measuring wheels are thus positively connected so that they rotate in exact unison, and any movement produced in one of the wheels is produced in the other wheel to guard against slippage of the measuring line, as later described. The axes of the sprocket hubs have axial openings 60 for passing the spindles 46. The openings, however, are of sufficient diameter to permit free rotation of the measuring wheels and sprockets on the antifriction bearings.

The tensioning device 35 includes a yoke-shaped member having forked arms 61 and 62 terminating over the measuring wheels 32 and 33, respectively. The yoke-shaped member has a web 63 on the side adjacent the casing wall 29 to cooperate with ears 64 on the other side thereof for mounting the ends of shafts 65 and 66 carrying grooved rollers 67 and 68 of suitable width to respectively engage within the peripheral grooves of the measuring wheels 32 and 33.

Carried by an antifriction bearing 69 that is mounted within a depending ear formed in the plane of the web 63 is a shaft 70 for mounting the measuring wheel 34. The measuring wheel 34 includes a disk-like body similar to the measuring wheels previously described, and is provided with a peripheral groove 71 of greater width than the grooves in the measuring wheels 32 and 33 so that the measuring line can be looped therearound to insure positive drive relatively to this wheel. The measuring wheel 34 is provided with a sprocket 72, fixed to the measuring wheel in the same manner as the sprockets previously described. The teeth of the sprocket engage the upper run of the chain belt at a point midway of the sprockets 57 for the spaced measuring wheels 32 and 33, so that all of the wheels are rotated in exact unison. The antifriction bearings, however, are eliminated in the wheel 34 for the reason that it is necessary for the wheel to drive the shaft 70 to actuate a register or counting device 73, later described.

The yoke-shaped member of the tensioning device is suspendingly supported on the reduced end 74 of an adjusting screw 75. The adjusting screw 75 has an enlarged threaded portion 76 engaged in a threaded bore 77 formed in a boss 78 on the upper side of the casing. The outer end of the screw carries a head 79 by which the screw is rotated to move the tensioning device into and out of engagement with the measuring line where it passes over the measuring wheels 32 and 33. The reduced end of the screw forms a shoulder with the threaded portion thereof to engage against a thrust washer 80, which bears against a boss 81 formed in the upper portion of the yoke-shaped member. The reduced end extends loosely through the boss 81 and is preferably provided with a cotter pin 83 that engages in a recess 84 formed in the lower side of the boss, so that when the screw is rotated in an anticlockwise direction the pressing rollers 67 and 68 are moved away from the measuring line.

Attention is here directed to the fact that for some reason, perhaps stretching of the line, there is a slight inaccuracy in measurement when the circumference of the wheels are in exact conformity to the unit of measure to be registered on the registering device 73. For example, if the unit of measure is the foot, the diameter of the measuring wheels would ordinarily be 3.819 inches, so that one revolution of the measuring wheel moves the counter one space to indicate a measured foot. I have found, however, that wheels of this diameter do not produce accurate measurement of the line actually run into the well. I have found that by providing wheels having diameters slightly smaller than the calculated size, I am enabled to provide a measuring device which will accurately register the length of measuring line paid into the well. In actual practice, I find that the diameters of the wheels for a foot measure should be from approximately 3.816 inches to less than 3.819 inches. It is to be understood, however, that with different units of measure, wheels of different size may be used, with their diameters varying in correspondence to such units to compensate for the inaccuracy due to line stretch or the like.

Formed in the respective ends of the casing, and in substantially tangential alignment with the peripheries of the line grooves in the respective pulleys, are bosses 85 and 86, having slots 87 and 88 opening to the terminal edges of the flange 30 to permit insertion of bushings 89 and 90, respectively, the outer ends of the slots being closed by lugs 91 on the cover plate and having arcuate seats 92 cooperating with the rounded ends 93 of the slots to form openings closely engaging the bushings.

The bushing 89 on the entry or reel side of the casing is preferably formed of felt or other like material capable of being lubricated to provide a lubricating element for the line as it is drawn through the casing, the lubricant being supplied from a suitable cup 94 that is threaded in the boss 85 for feeding lubricant into a channel 95 formed in the bushing. The end of the bushing has flanged heads 96 and 97 engaging the respective ends of the boss to prevent displacement thereof.

The bushing 90 on the exit or well side of the casing is of substantially the same shape but is preferably formed of rubber or similar material to provide a wiper for removing excess lubricant from the measuring line as the line is being paid into the well, and for wiping well fluid from the line when the line is withdrawn. At all times the rubber bushing is toward the well, the object of which is to wipe residue, principally salt water, or acid formulas or compounds, from the line, therefore, preventing corrosion detrimental to the line, which in time would cause expensive fishing jobs owing to the breaking or parting of the line in the well, and also, conserving and extending the life of the line, wherever the above mentioned residues have caused a weakness from eating the metal line. After the line has been wiped of well fluid, it is again lubricated at the time it passes through the bushing 87. The bushings are preferably formed of half sections, so that they may be readily sleeved over the line. The bushing sections, after being applied to the line and placed in the slots, are secured by pins 98 extending through the bosses on the interior side of the casing, and through registering openings in the bushings, as best shown in Fig. 6.

The registering device 73 is carried upon the arm 99 of a bracket plate 100 engaging against an elongated boss 101 formed in the plate portion of the casing and provided with a slot 102 for passing the driven shaft 103 of the registering device. The projecting end of the shaft 103 is flattened or otherwise adapted to engage with the preferably slotted end of the shaft 70 to effect driving connection therewith.

Cooperating with the plate portion of the bracket, and engaging in a socket 104 formed in the opposite side of the boss 101, is a clamping plate 105, having slots 106 and 107 for passing fastening devices 108 and 109 that are threaded into the boss as shown in Fig 4. The heads of the fastening devices cooperate with the socket 104 to retain the plate in vertical sliding relation relatively to the casing. The clamping plate is provided with an opening for passing the shaft 70. Formed in the ends of the clamping plate, in aligning registry with slots 111 and 112, are threaded openings 113 and 114. Extending through registering openings in the outer plate are the shanks 115 and 116 of clamping screws 117 and 118, the shanks of the screws being threaded to engage in the threaded openings 113 and 114 of the inner clamping plate. The outer ends of the shanks have knurled heads 119 and 120 adapted to engage against the plate portion of the bracket when the shanks are threaded into the openings of the inner plate.

The cover side of the respective measuring wheels are provided with numerals as indicated at 121, Fig. 7, to indicate inches or divisions of the units recorded by the registering device. These units are readable upon removal of the cover plate, however, should the cover plate be kept in place the numerals on the measuring wheel 34 are readable through a window 122 formed in the cover plate in substantially horizontal alignment with the axis of the wheel.

The sounding device 6 preferably includes a tubular casing 123 closed at its upper end by a cone-shaped head 124. The apex of the head is provided with an eye 125 for attaching the end of the measure line 5. The lower end of the casing is closed by a plug 126 to form a water-tight chamber for enclosing the sounding mechanism. The sounding mechanism illustrated includes an alarm device 127 that is attached directly to the inner face of the casing, so that when the alarm is energized, vibrations are transmitted through the casing to the measuring line and through the measuring line to the top of the well. In the illustrated instance, the alarm device comprises an electrically operated buzzer supplied with an energizing current from a battery 128 that is supported within the casing by suitable brackets 129 and 130.

One of the terminals of the battery is directly connected with one of the buzzer terminals by a conductor 131, while the other battery terminal is connected by a flexible conductor 132 with a contact 133 on a sounding rod 134. The rod 134 is slidable through the head 126 and carries a weight 135 that is adapted to engage the bottom 4 of the well, to effect relative movement of the casing for bringing a contact 136 into engagement with the contact 133. The contact 136 is insulatingly supported within the casing on a bracket 137 and is connected with the other terminal of the buzzer by a conductor 138.

In order to prevent leakage of well fluid into the casing, the head 126 is provided with a packing gland 139 to seal about the sounding rod 134, but which permits relative movement between the casing and the rod at the time the head 135 engages the bottom of the well, to effect closing of the contacts 133 and 136 for completing a circuit through the battery to the buzzer 127.

In operating a measuring apparatus constructed as described, the post 9, carrying the reel 12, is located adjacent the well to be measured, the post being supported in upright position by pressing the point 18 thereof into the ground by foot pressure applied to the foot bar 19. A pulley block 140 is then suitably suspended over the center of the well by a cable 141 attached to a gin pole, derrick, or other suitable support, not shown. The end of the measuring line is withdrawn from the reel, run over the pulley block 140 and attached to the eye 125 of the sounding device which is then moved into position ready to be lowered into the well. The measuring device 8 is then suspended from the spring leaf 27 by means of a cord 142, or the like, that is suitably engaged with the head 79 of the adjusting screw as by the eye 143, shown in Fig. 1.

The cover plate 36 is then removed by rotating the knurled heads 39 of the fastening devices 37 and 38 to unscrew the stems thereof from threaded engagement with the spindles 45 and 46. Since the fastening devices are rotatingly anchored in the cover plate, it is preferable that they be rotated in unison, so as to prevent binding thereof.

The bushings 89 and 90 are removed from the slots 87 and 88 and the T-shaped head is actuated to raise the tensioning device 35 to move the rollers 67 and 68 away from the measuring wheels 32 and 33. A loop 144 is then formed in the measuring line and projected over the measuring wheel 34 so that it enters the groove thereon, as shown in Fig. 3. In this position, the measuring line enters the slots 87 and 88, so that it is in line with the grooves of the measuring wheels 32 and 33.

The bushings 89 and 90 are then applied to the line and pressed into their respective slots, the rubber bushing 90 being pressed into the slot on the entry or reel side of the casing and the felt or other bushing 89 on the exit or well side of the casing. The T-shaped head is then rotated in the opposite direction to cause movement of the grooved rollers 67 and 68 into engagement with the measuring line to retain the lines in frictional engagement with the bottoms of the peripheral grooves in the wheels 32 and 33.

In this position, there is slight tension applied to a portion of the measuring line between the measuring wheels 32 and 33 for the reason that the periphery of the measuring wheel 34 projects below the periphery of the measuring wheels 32 and 33, as shown in Fig. 3.

The cover plate 36 is then applied by threading the shanks of the fastening devices 37 and 38 into the threaded sockets of the spindles 45 and 46. The clamp screws 117 and 118 are then tightened to support the registering device in fixed alignment with the shaft of the measuring wheel 34.

The brake lever 12, or other means provided for the purpose, is released to allow lowering of the sounding device into the well. During lowering of the sounding device, the line moving through the casing of the measuring device rotates the measuring wheels 32, 33 and 34, in unison by means of the chain belt 59. Upon each revolution of the measuring wheel 34, the register is advanced one space to indicate the number of feet of measuring line paid into the well. During movement of the measuring line into the well, lubricant is applied thereto by means of the felt bushing 89, and excess lubricant is wiped from the line at the time it passes through the rubber bushing 90.

When the sounding device has been lowered so that the head 135 engages the bottom of the well, movement of the sounding rod 134 is suspended but there is sufficient relative movement of the casing 123 to cause the contact 136 to engage the contact 133, closing the battery circuit to the buzzer 127. The buzzer 127 is immediately activated and the vibrations are transmitted through the casing to the measuring line and through the measuring line indicating to the operator that sufficient line has been let into the well to complete the measurement. He then applies the brake to stop further movement of the measuring line.

The depth of the well is then read on the registering device in terms of feet, and any fraction thereover is read in inches, by observing the numeral appearing through the window 122. To remove the sounding device from the well, the reel is rotated in the opposite direction to wind the cable thereon by actuating the crank 17 or power pulley. During withdrawal of the measuring line, the bushing 90 is effective in wiping well fluid from the line, and the line is again lubricated when it is passed through the felt bushing 89.

The principal advantage in the measuring apparatus which I have provided is the accurate operation thereof, whereby the exact depth of a well may be readily determined.

It is also apparent that the resilient mounting of the measuring device by means of the spring leaf allows the line to adjust itself relative to the angle between the reel and the pulley block suspended above the center line of the well and to avoid riding of the device on the line.

It is also obvious that by providing measuring wheels of proper diameters, I am able to compensate for any stretch or roughness of the cable in the measuring line and thereby avoid inaccuracy in the recorded measurement.

Further, the provision of the sounding device increases the accuracy of the registration of well depths by indicating the exact bottom of the well hole.

What I claim and desire to secure by Letters Patent is:

1. A measuring device including a casing, a pair of spaced wheels journalled in the casing having peripheral grooves for receiving a measuring line, a tensioning member adjustably mounted in the casing for movement toward and from the line passing over said wheels, a measuring wheel carried by said member having a peripheral groove for receiving a loop formed in the line between said pair of wheels, means carried by the tensioning member for pressing the measuring line into contact with said pair of spaced wheels, and means interconnecting said three wheels for positive synchronous movement.

2. A measuring device including a casing, a pair of spaced wheels journalled in the casing having peripheral grooves for receiving a measuring line, a tensioning member adjustably mounted in the casing for movement toward and from the line passing over said wheels, a measuring wheel carried by said member having a peripheral groove for receiving a loop formed in the line between said pair of wheels, means carried by the tensioning member for pressing the measuring line into contact with said pair of spaced wheels, means interconnecting said three wheels for positive synchronous movement, and a register adjustably mounted exteriorly of the casing and removably engaged with the measuring wheel.

3. A measuring device including a casing, a pair of spaced wheels journalled in the casing having peripheral grooves for receiving a measuring line, a tensioning member adjustably mounted in the casing for movement toward and from the line passing over said wheels, a measuring wheel carried by said member having a peripheral groove for receiving a loop formed in the line between said pair of wheels, means carried by the tensioning member for pressing the measuring line into contact with said pair of spaced wheels, means interconnecting said three wheels for positive synchronous movement, and a register operatively engaged with the measuring wheel.

RICHARD C. MASON.